United States Patent Office 3,431,300
Patented Mar. 4, 1969

3,431,300
PREPARATION OF 2-CHLORO-4-NITRO-6-METHYLBENZAMIDE
Edward F. Rogers, Middletown, and Robert L. Clark, Woodbridge, N.J., assignors to Merck & Co., Inc., Rahway, N.J., a corporation of New Jersey
No Drawing. Filed Mar. 17, 1965, Ser. No. 440,617
U.S. Cl. 260—558     3 Claims
Int. Cl. C07c *103/22, 103/02*

---

ABSTRACT OF THE DISCLOSURE

Anticoccidial 2-chloro-4 - nitro-6 - methylbenzamide is prepared by treating 2-chloro-4-nitro-6-methylaniline with an alkali metal nitrite under diazotization conditions and reacting the diazonium salt so produced with cyanide ion in the presence of nickel chloride to form 2-chloro-4-nitro-6-methylbenzonitrile which is then hydrolized with mineral acid. It is contemplated that dosage units containing the benzamide will be administered orally in the control of coccidiosis in poultry.

---

This invention relates to new chemical compounds. More specifically, it relates to a novel benzamide useful in the treatment of the poultry disease coccidiosis, and to intermediates for making such amide. Still more specifically, it is concerned with the novel 2-chloro-4-nitro-6-methylbenzamide, its method of preparation, and to its use as a coccidiostat. It is concerned further with anticoccidial compositions containing 2-chloro-4 - nitro - 6-methylbenzamide as an active anticoccidial ingredient.

Coccidiosis is a disease caused by protozoan parasites of the genus Eimeria. Poultry coccidiosis is a particularly serious economic problem for the poultry industry. Many types of poultry coccidiosis occur depending upon the species of Eimeria present, and birds that are immune to one species are still susceptible to attacks by other species. The disease is characterized by diarrhea and hemorrhage and when left untreated may lead to poor weight gain, reduced feed efficiency and/or egg production, and death.

Among the most troublesome species of coccidia are *E. tenella* and *E. necatrix* in that they cause the most lethal forms of the disease. Both act primarily on the caecum and cause what are characterized as caecal forms of coccidiosis. *E. acervulina, E. maxima* and *E. brunetti* cause an intestinal form which is also a great problem for the poultry raiser. Unfortunately, several known coccidiostats which are highly effective against the caecal forms of coccidiosis are less active against the intestinal species.

It is an object of the present invention to provide a new chemical compound useful in the control of coccidiosis. A more particular object is provision of a compound having significant activity against intestinal coccidiosis, and especially against the *E. brunetti* species of coccidia, while at the same time having activity against *E. tenella*. It is a further object to provide a method of preparing such compound from 2-chloro-4-nitro-6-methylaniline. An additional object is provision of novel compounds useful as intermediates in such syntheses. A further object is the provision of novel compositions containing 2-chloro-4-nitro-6-methylbenzamide as an active anticocidial ingredient. Further objects will be evident from the following description of the invention.

According to the present invention, it has now been found that 2-chloro-4-nitro-6-methylbenzamide has valuable anticoccidial activity. It has been found further that this substance unexpectedly has significant activity against coccidiosis due to *E. burnetti*, while also having good activity against the caecal forms due to *E. tenella*.

2-chloro-4-nitro-6-methylbenzamide is prepared according to the invention from 2-chloro-4-nitro-6-methylaniline by diazotizing the latter compound, treating the resulting 2-chloro-4-nitro-6-methylbenzenediazonium salt with cyanide ion to obtain 2-chloro-4-nitro-6-methylbenzonitrile, and hydrolyzing the nitrile with strong acid.

In the first step of this process, 2-chloro-4-nitro-6-methylaniline is converted to its diazonium salt by reacting it with an alkali metal nitrite, such as sodium or potassium nitrite, under diazotization conditions. The diazotization is carried out by intimately contacting the reactants in the cold in the presence of a strong mineral acid, such as sulfuric, hydrochloric acid or hydrobromic acid. A reaction temperature of from about −10° C. to +20° C. is suitable, and good results are obtained by carrying out the diazotization under these conditions for from ½–5 hours. In this way there is obtained a diazonium salt of the structural formula

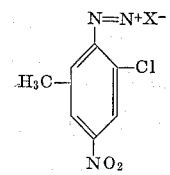

where X is an anion of a strong mineral acid corresponding to the acid employed in the reaction.

In a preferred embodiment of the process, this salt is not isolated, but rather is treated directly with cyanide ion in an aqueous medium and in the presence of a suitable catalyst to obtain 2-chloro-4-nitro-6-methylbenzonitrile. It is preferred to use an alkali metal cyanide, such as sodium or potassium cyanide, as the source of cyanide ion, although any ionizable cyanide salt may be employed. The preferred catalyst is nickel chloride although other water-soluble nickel salts may be used satisfactorily. In actual practice a nickelocyanide complex is conveniently prepared from an alkali metal cyanide and nickel chloride, and this complex used as the source of cyanide ion and nickel catalyst. The reaction is carried out at a pH of about 6–8 at 20–75° C. The 2-chloro-4-nitro-6-methylbenzonitrile thus produced is insoluble in the aqueous reaction medium, and is recovered by filtration and purified by methods known to those skilled in this art.

In the final step of the process, 2-chloro-4-nitro-6-methylbenzonitrile is hydrolyzed to 2-chloro-4-nitro-6-methylbenzamide with a strong mineral acid, and preferably with sulfuric acid, fuming sulfuric acid or a mixture thereof. The hydrolysis is brought about by heating the nitrile and acid together at elevated temperatures of about 70–100° C. for ½–5 hours. The amide is obtained by quenching the acid reaction mixture in ice or ice water, and purified by recrystallization.

2-chloro-4-nitro-6-methylbenzamide is used to treat or prevent coccidiosis in poultry by administering it to the birds as a component of the feed or drinking water. For prophylactic use, incorporation into the feed is preferred. The amount of 2-chloro-4-nitro-6-methylbenzamide necessary for optimum control of the disease depends on the type and severity of the infection and the duration of treatment. Feed levels of from about 0.01% to about 0.15% by weight (of the feedstuff) are generally used, with levels of about 0.02% to 0.1% by weight of feed being preferred. When the compound is administered by way of the drinking water, somewhat lower levels will be satisfactory since the birds drink about twice as much as they eat. The use of the active agent in drinking water is made more practically useful by addition to the water of a dispersing or suspending agent to promote uniform distribution of the drug.

The finished feeds are those which furnish nourishment to the poultry and which are normally used in the poultry industry. The feedstuff to which the coccidiostat of this invention is added may be a mash containing ground grain, animal and vegetable proteins, mineral and vitamin concentrates, or it may be a broiler feed containing a large proportion of ground yellow corn together with other nutritive substances such as fish meal, soybean oil meal, meat products, minerals and vitamins. In any event, it is a nutritionally adequate one for poultry and has dispersed in it a minor anticoccidially-effective amount of 2-chloro-4-nitro-6-methylbenzamide. The feedstuff is administered ad libitum to the birds during the desired period of their lifespan and usually for a period of weeks.

The 2-chloro-4-nitro-6-methylbenzamide may be added to the feed directly or via premixes which may contain about 5% to 50% by weight of the active ingredient. These premixes or poultry feed additives, in which the anticoccidial ingredient is present in relatively large amounts, represent a preferred aspect of the invention. The carrier vehicle or diluent for the premixes should be relatively inert and safely administrable to the poultry. It is preferred to use diluents which have nutritive value for the poultry and which are normal ingredients of the finished feed, e.g. cereal or grain carriers. Diluents normally employed are solid orally ingestible carriers such as distillers' dried grains, corn meal, wheat middlings, fermentation residue, corn gluten feed, citrus meal, ground oyster shells, Attapulgus clay, wheat shorts, molasses solubles, corn cob meal, toasted dehulled soya flour, soybean mill feed, crushed limestone, soya grits and the like.

The 2-chloro-4-nitro-6-methylbenzamide of this invention may be used alone in the prevention and control of coccidiosis or it may be used in conjunction with other anticoccidial agents. Since the compound of our invention is of primary interest because of its activity against those forms of the disease caused by *E brunetti*, it is preferred in many cases to administer to poultry a ration or drinking water containing 2-chloro-4-nitro-6-methylbenzamide and another coccidiostat having activity primarily against the caecal forms of the disease and in particular those caused by *E. tenella*. Examples of such other coccidiostats are nicarbazin, amprolium, 3,5-dinitrobenzamide and 2-methyl-3,5-dinitrobenzamide. When such a combined form of treatment is to be used, it is preferred to make a feed premix or poultry feed additive containing both drugs and to supplement the poultry feedstuff with such an additive.

The following examples are given for the purpose of illustration and not by way of limitation.

EXAMPLE 1

1.6 grams of sodium nitrite is dissolved in 11 ml. of concentrated sulfuric acid at a temperature of about 20–30° C. The solution is chilled to about 0° and there is added to it with stirring a suspension of 3.8 grams of 2-chloro-4-nitro-6-methylaniline in 25 ml. of acetic acid. During addition of the acetic acid suspension the temperature is maintained below 20° C. by external cooling. 2-chloro-4-nitro-6-methylbenzenediazonium sulfate is produced and used directly, without isolation, as described below.

A solution of 10 grams of potassium cyanide in 50 ml. of water is added to a hot solution of 5 grams of nickel chloride hexahydrate in 30 ml. of water. To the resulting solution there is added 21 grams of sodium carbonate in 50 ml. of water.

To the nickelocyanide solution obtained as described in the immediately preceding paragraph the cold solution of 2-chloro-4-nitro-6-methylbenzenediazonium sulfate is added slowly with stirring, maintaining the temperature below 20° C. The resulting mixture is stirred for 15 minutes below 20° C. and then warmed to 50° C. over a 15 minute period. It is then cooled to about 10–15° C. 2-chloro-4-nitro-6-methylbenzonitrile precipitates and is collected by filtration. The product is recrystallized from ethanol to give substantially pure material, M.P. 92–93° C.

EXAMPLE 2

4 grams of 2-chloro-4-nitro-6-methylbenzonitrile is dissolved in 20 ml. of concentrated sulfuric acid. 0.5 ml. of fuming sulfuric acid is then added and the resulting solution heated at 90° C. for 90 minutes. The reaction mixture is then poured over ice to precipitate 2-chloro-4-nitro-6-methylbenzamide. This product is removed by filtration and recrystallized from ethyl acetate to give substantially pure material, M.P. 216–217° C.

Any departure from the above description which conforms to the present invention is intended to be included within the scope of the claims.

We claim:
1. The process for preparing 2-chloro-4-nitro-6-methylbenzamide which comprises treating an acetic acid solution of 2-chloro-4-nitro-6-methylaniline with an alkali metal nitrite in the presence of a strong mineral acid selected from the group consisting of sulfuric acid, hydrochloric acid and hydrobromic acid at about —10° C. to 20° C. to obtain 2-chloro-4-nitro-6-methylbenzenediazonium salt; reacting said salt in an aqueous medium with an ionizable cyanide salt in the presence of nickel chloride at 20° C. to 75° C. and at a pH of about 6 to 8 to form 2-chloro-4-nitro-6-methylbenzonitrile; and hydrolyzing benzonitrile with a strong mineral acid selected from the group consisting of sulfuric acid, fuming sulfuric acid and mixtures thereof at about 70° C. to 100° C.

2. The process of claim 1 wherein the ionizable cyanide salt is an alkali metal cyanide.

3. The process of claim 1 wherein the benzonitrile is hydrolyzed with sulfuric acid, fuming sulfuric acid or a mixture thereof.

References Cited

FOREIGN PATENTS 896,720    5/1962    Great Britain.

HENRY R. JILES, *Primary Examiner.*

H. I. MOATZ, *Assistant Examiner.*

U.S. Cl. X.R.

260—141, 465, 999